US006936974B2

(12) United States Patent
Melis

(10) Patent No.: US 6,936,974 B2
(45) Date of Patent: Aug. 30, 2005

(54) HALF-BRIDGE INVERTER FOR ASYMMETRICAL LOADS

(75) Inventor: Janos Melis, Miami, FL (US)

(73) Assignee: Ballastronic, Inc., Miami, FL (US)

( * ) Notice: Subject to any disclaimer, the term of this patent is extended or adjusted under 35 U.S.C. 154(b) by 23 days.

(21) Appl. No.: 10/768,453

(22) Filed: Jan. 30, 2004

(65) Prior Publication Data

US 2005/0168157 A1   Aug. 4, 2005

(51) Int. Cl.[7] ............................................. H05B 37/02
(52) U.S. Cl. .................. 315/209 R; 315/224; 315/279
(58) Field of Search ........................... 315/209 R, 224, 315/218, 282, 279, 291

(56) References Cited

U.S. PATENT DOCUMENTS

| 5,229,927 A | 7/1993 | Vila et al. ...................... 363/23 |
| 5,253,157 A | 10/1993 | Severinsky ................... 363/98 |
| 5,313,143 A | 5/1994 | Vila et al. ............... 315/209 R |
| 5,932,976 A | 8/1999 | Maheshwari et al. ....... 315/291 |
| 5,982,106 A * | 11/1999 | Bobel ...................... 315/209 R |
| 6,242,867 B1 | 6/2001 | Pogadaev et al. ............ 315/224 |
| 6,329,761 B1 | 12/2001 | Melis et al. ............. 315/209 R |
| 6,603,674 B2 * | 8/2003 | Franck et al. .................. 363/97 |

OTHER PUBLICATIONS

J. Melis, Ballast curves for HPS lamps operating on high frequency, IAS 1992, Technical Conference, Houston, Texas.
J. Melis, Master-slave half-bridge inverter, APEC 1993, Orlando, Florida.
M.C. Unglert, The need for high-pressure sodium ballast classification, Lighting Design and Application, Mar. 1982.

* cited by examiner

Primary Examiner—Tuyet Thi Vo

(57) ABSTRACT

The invention pertains to a switchmode power inverter, and particularly to a half-bridge inverter for asymmetrical load. More particularly, the invention pertains to high frequency electronic ballast for gas discharge devices, especially for high intensity discharge lamps, completed by an internal high voltage ignition circuit and transient current control protecting against the asymmetrical feature of high intensity discharge lamps at startup.

8 Claims, 9 Drawing Sheets

HALF-BRIDGE INVERTER FOR ASYMMETRICAL LOADS

CROSS-REFERENCE TO RELATED APPLICATION

Not applicable

BACKGROUND OF THE INVENTION

The present invention relates to high frequency switch-mode half-bridge inverters for asymmetrical loads and specifically to high frequency electronic ballasts for gas discharge devices. More specifically, the present invention relates to high frequency electronic ballast for high intensity discharge (HID) lamps.

The prior art is replete with many known half-bridge inverters providing high frequency ballast for gas discharge lamps, especially for HID lamps. For instance, high efficient electronic ballasts based on half-bridge inverter configuration which can be used with HID (HPS) lamps are U.S. Pat. No. 5,313,143 entitled "Master-slave half-bridge DC-to-AC switchmode power inverter" (See also a paper entitled "Master-Slave Half-Bridge Inverter" presented at APEC'93); U.S. Pat. No. 5,229,927, entitled "Self-symmetrizing and self-oscillating half-bridge power inverter", and U.S. Pat. No. 6,329,761, entitled "Frequency controlled half-bridge inverter for variable loads" from the same inventor of the present invention. Further applications of half-bridge inverters are U.S. Pat. No. 5,253,157, entitled "Half-bridge inverter with capacitive voltage equalizer" from Severinsky; U.S. Pat. No. 6,242,867, entitled "Circuit for synchronizing the ignition of electronic ballast discharge lamps" from Pogadaev, and U.S. Pat. No. 5,932,976, entitled "Discharge lamp driving" from Maheshwari, especially for ignition methods. Some of the cited inventions provide solution for equalizing the voltages of the voltage divider capacitors of a half-bridge inverter, but none of these inventions solves a specific problem related to the startup process of a HID lamp, especially for metal halide lamps, described in the following part.

An important application of the switchmode power inverters is supplying gas discharge devices, especially high intensity discharge (HID) lamps in the range of 35W to 400W. In this case, the load impedance of the inverter is a HID lamp connected in series with an inductor. At high frequency powering of a HID lamp, the interaction between the ballast and the lamp is more sensitive than that of a conventional low frequency (50/60 Hz) ballast. During the startup process, including the transition from glow to arc discharge, HID lamps may have asymmetrical impedance resulting unequal voltages of the voltage divider capacitors of the half-bridge inverter (See FIG. 8).

For instance, let V2>V3, where V2+V3=V1=constant. At the end of the startup process, the lamp goes into arc discharge state having symmetrical impedance. Therefore, if the ON-times of the main switches are equal, a transient process starts, and after a certain time interval, the equilibrium V2=V3 is achieved. During this transient process high current peak occurs (V2>V3) which can damage the main switches of the inverter. Furthermore, the inductor may be also saturated causing an extra current peak exceeding the maximum allowable current peak values of the main switches.

The present invention provides a protection, namely a dynamic solution for the limitation of high current peaks during the startup process.

Furthermore, the present invention introduces a different, and more effective ignition solution than the ignition solution of U.S. Pat. No. 6,329,761, providing essentially less stress for the main switches of a half-bridge inverter.

Also, the present invention provides a special MOSFET driver solution for the main switches of a half-bridge inverter, wherein the main switches can be simultaneously switched off applying an more effective solution comparing to the MOSFET drivers applied in the mentioned patent applications, for instance in U.S. Pat. No. 6,329,761, wherein the main switches can be simultaneously switched off slowly, causing high dissipation in the switches at inductive load, therefore, they are incapable for fast and repeating current protection caused by an asymmetrical load during the startup process.

Furthermore, the theoretical background for the practical lamp power control, where the lamp is connected in series with an inductor and supplied by a square wave inverter (push-pull, half-bridge, or full bridge) resulting a special ballast curve can be found in a paper of J. Melis, entitled "Ballast Curves for HPS Lamps Operating on High Frequency" (IAS' 92).

BRIEF SUMMARY OF THE INVENTION

It is an object of the present invention to provide a high efficient switchmode half-bridge square wave inverter which has protection against the effect of asymmetrical loads.

A second object of the present invention to provide a reliable electronic ballast for gas discharge devices acting as temporary asymmetrical loads at startup.

A further object of the present invention to provide an effective driver solution capable to switch off simultaneously the main switches of a half-bridge inverter controlled by square wave voltage signal having three states (+12V, 0V, −12V).

Another object of the present invention to provide a simple power control of the load, especially HID lamps, where the lamp power remains constant during the aging of the lamp which means continuously increasing lamp voltage, or equivalently, increasing ohmic impedance at high frequency operation.

Further object of the present invention to provide a fast, direct limitation of the load current caused by the asymmetrical impedance of an ignited high intensity gas discharge (HID) lamp during the startup process.

Another object of the present invention to provide a high voltage ignition circuit for a reliable ignition of HID lamps, especially an almost instant reigniting of warmed up lamps in a wide temperature range.

Further object of the present invention to provide dimming capability for the lamp providing significant energy saving under certain conditions when the full power (full light) of the lamp is not required in certain times.

These and other objects, features and advantages of the present invention will be more readily apparent from the following detailed description, wherein reference is made to the drawings.

DETAILED DESCRIPTION OF THE INVENTION

Figure 1:
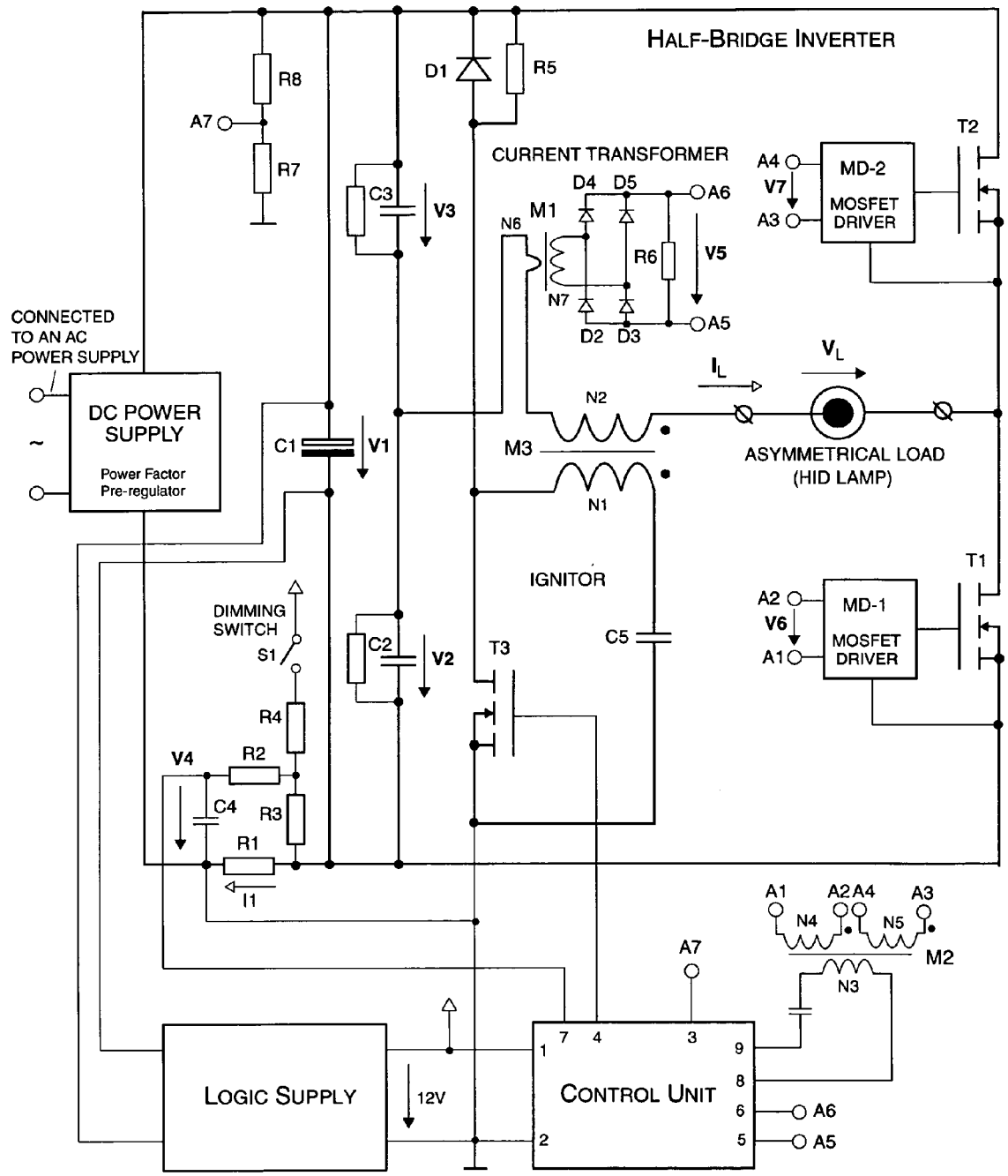
FIG. 1 illustrates a schematic diagram of the preferred half-bridge inverter for HID lamps connected to a DC power supply (power factor pre-regulator) including an Ignitor, Current Transformer, two identical MOSFET Drivers, Logic Supply and a Control Unit.

FIG. 1 shows a schematic diagram of the preferred half-bridge inverter configuration as an electronic ballast for HID lamps, where the Half-Bridge Inverter, connected to a DC power supply through the capacitor C1, is illustrated in detail. In many cases, the DC power supply is implemented by a Power Factor Pre-regulator providing high power factor and stabilized DC voltage source (V1) for the Half-Bridge Inverter as it is also shown in FIG. 1. The Input Unit is connected to an AC Power Supply (50/60 Hz, 120V–240V). A Logic Supply provides stabilized 12V for the Control Unit (connecting points 1 and 2) which is also shown in FIG. 1. The Control Unit will be described in details.

The Half-Bridge Inverter includes the basic components of a half-bridge inverter: two electronically controlled switches (MOSFETs T1 and T2), two voltage divider capacitors C2 and C3 and a load impedance (a HID lamp connected in series with an inductor M3).

Figure 2:
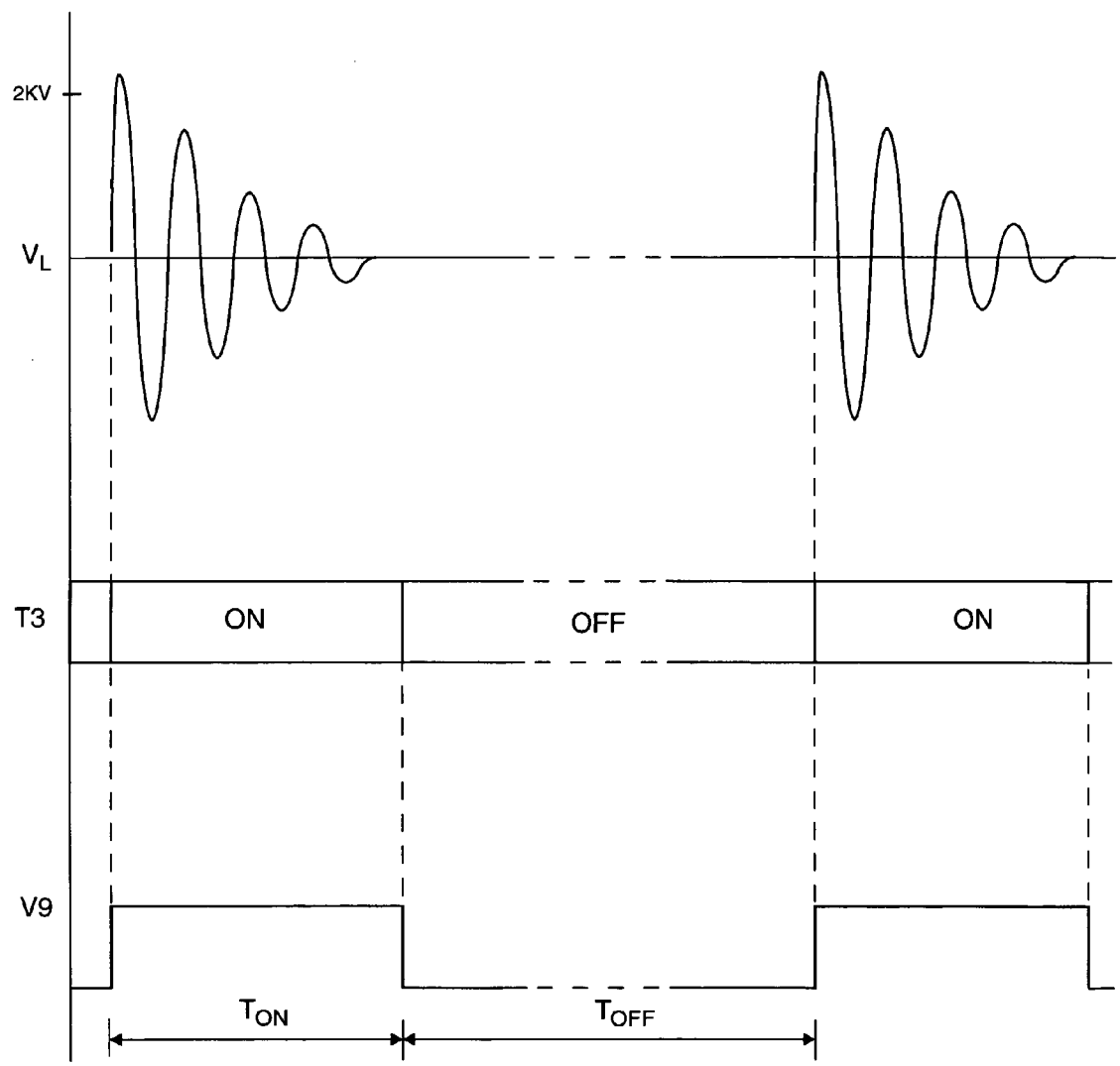
FIG. 2 shows the ignition signals and related control waveforms.

The Half-Bridge Inverter also includes the preferred embodiment of a high voltage ignition apparatus in which winding N1 of the inductor M3 is connected in series with the capacitor C5 and MOSFET T3. When T3 is on, a high frequency damped sinusoidal voltage occurs across the winding N1. This voltage is transformed up by winding N2 to an approximately 2000V providing sufficient ignition voltage ($V_L$) for a HID lamp shown in FIG. 2, also achieving almost instant reigniting of warmed up lamps. The ON/OFF-times of transistor T3 is controlled by the Control Unit (connecting point 4), where V9 (see FIG. 4) is the gate voltage of T3. The capacitor C5 is periodically charged by resistor R5 since the OFF-time of T3 is essentially longer then its ON-time. The rectifier D1 limits the drain voltage of MOSFET T3 approximately to the DC supply voltage V1.

Figure 3A:
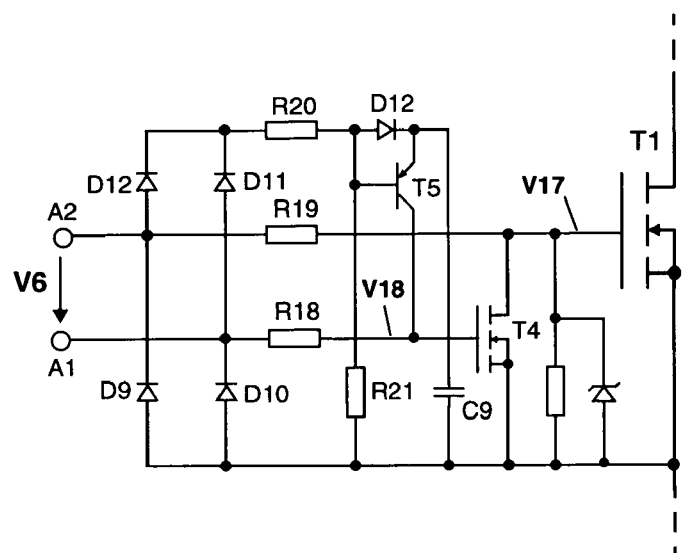
FIG. 3A shows the preferred schematic diagram of the preferred MOSFET Drivers providing effective drivers and fast simultaneous switching off solution for the main switches, which are generally accomplished by MOSFETs in higher frequency range.
Figure 3B:
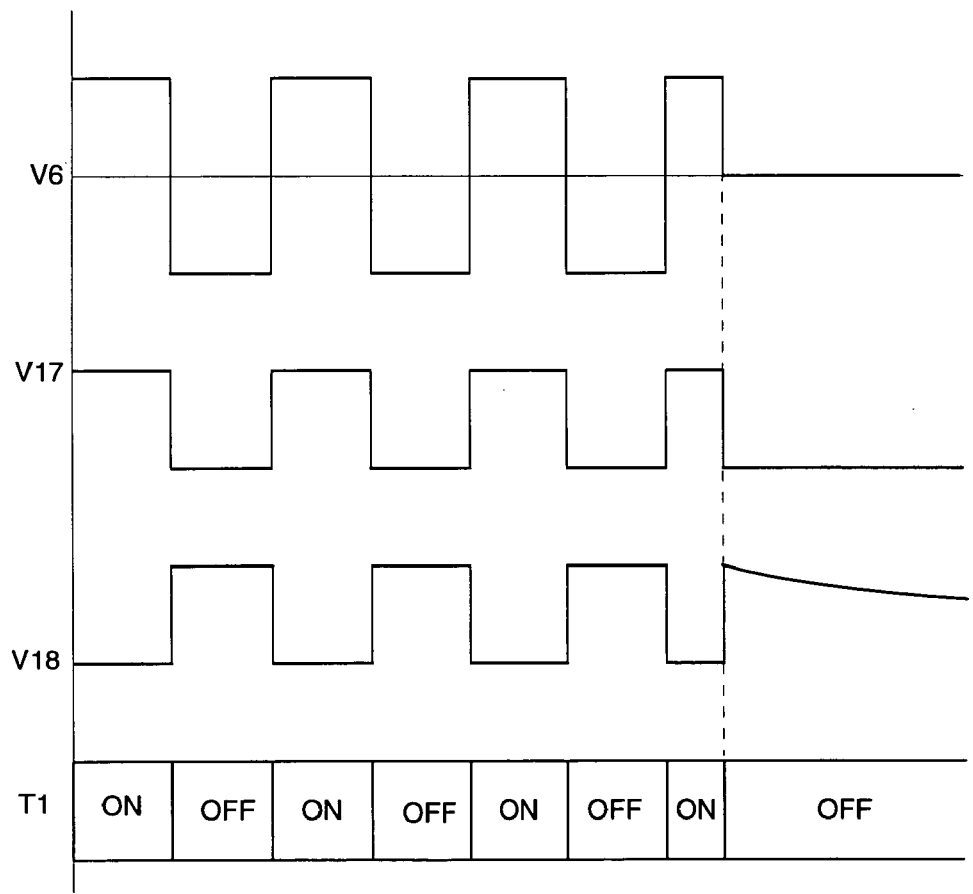
FIG. 3B shows the control signals of preferred MOSFET Driver.

The Half-Bridge Inverter further includes the preferred embodiment of two identical MOSFET drivers MD-1 and MD-2 utilized by the present invention. The MOSFET Driver MD-1 is shown in FIG. 3A, including a low power MOSFET T4, a low power bipolar transistors T5, rectifiers D9, D10, D11 and D12 connected in a bridge configuration, a capacitor C9, resistors R18, R19, R20 and R21, and a diode D12. A square wave AC control signals V6 (see FIG. 3B) is provided by the secondary winding N4 (connecting points A1 and A2) of the low power signal transformer M2 shown in FIG. 1. Similarly, the secondary winding N5 (connecting points A3 and A4) is connected to the MOSFET Driver MD-2. The primary winding N3 of the signal transformer M2 is connected to the connecting points 8 and 9 of the Control Unit. During the positive half-period, with respect to the point sign of the secondary winding N4, a positive voltage is connected across the resistor R19 and rectifier D10 to the gate of the N-channel power MOSFET T1 providing ON-state, while the MOSFET T4 is in OFF-state. During the negative half-period, a positive voltage is connected across resistor R18 and rectifier D9 to the gate of T4 providing ON-state. Therefore, the gate of T1 is short circuited to the source of T1 by MOSFET T4 providing an excellent current sink capability thus a very short switching off time for MOSFET T1. In both half periods the capacitor C9 is charged through the resistor R20 and diode D12 nearly to the amplitude of the square wave voltage V6. Furthermore, the bipolar transistor T5 is connected to the gate of MOSFET T4 in such a way that when the output voltage of the control transformer is zero, the MOSFETs T4 will be ON for an appropriate time, therefore power MOSFET T1 will be OFF as it is illustrated in FIG. 3B where V17 is the gate voltage of T1 and V18 is the gate voltage of T4. This low power loss MOSFET driver was specifically designed for inductive loads as it is in our case. Evidently, the same description can be applied for the upper MOSFET driver MD-2. Therefore, very low power loss can be achieved with respect to the switching transistors T1 and T2, resulting high efficiency for the half-bridge inverter. The main signals for the preferred MOSFET driver are shown in FIG. 3B, illustrating the simultaneous OFF-states of the main switching power transistor T1 and T2 if the square wave control signals V6=V7=0 in current limiting mode.

The Half-Bridge Inverter also includes a Current Transformer including an actual transformer M1, where the primary winding N6 is connected in series with the load and the secondary winding N7 connected to the AC input of a bridge rectifier implemented by the fast rectifiers D2, D3, D5, and D5. The DC output of the bridge rectifier is connected to resistor R6 providing low voltage signal V5 nearly proportional to the load current. The output points of the Current Transformer A5, and A6 are connected to the connecting points 5 and 6 of the Control Unit as it is shown in FIG. 1. Therefore, the transient operation at asymmetrical loads can be controlled by the Control Unit as it will be described later.

The Power Unit further includes a power resistor R1 in which the current I1 has an unidirectional high frequency waveform determined by the DC Power Supply, which is generally a boost converter. The voltage across the resistor is filtered by C4 and R3 connected in series with R2 (RC filter), therefore the voltage V4 across C4 is nearly DC and proportional to the average load current. This voltage—assuming nearly constant DC supply voltage V1 for the half-bridge inverter, is also proportional to the input power of the half-bridge inverter (ballast) which is nearly equal to the lamp power. Since the input voltage (V1) of the actual ballast unit (Half-Bridge Inverter) is nearly constant, the control of the lamp power can be easily implemented by frequency control in a relatively narrow range. If the Dimming Switch S1 (connected in series with resistor R4) is ON, the voltage V4 significantly increases. In this case the frequency of the inverter will have a predetermined maximum value providing approximately half power for the lamp.

Figure 4:
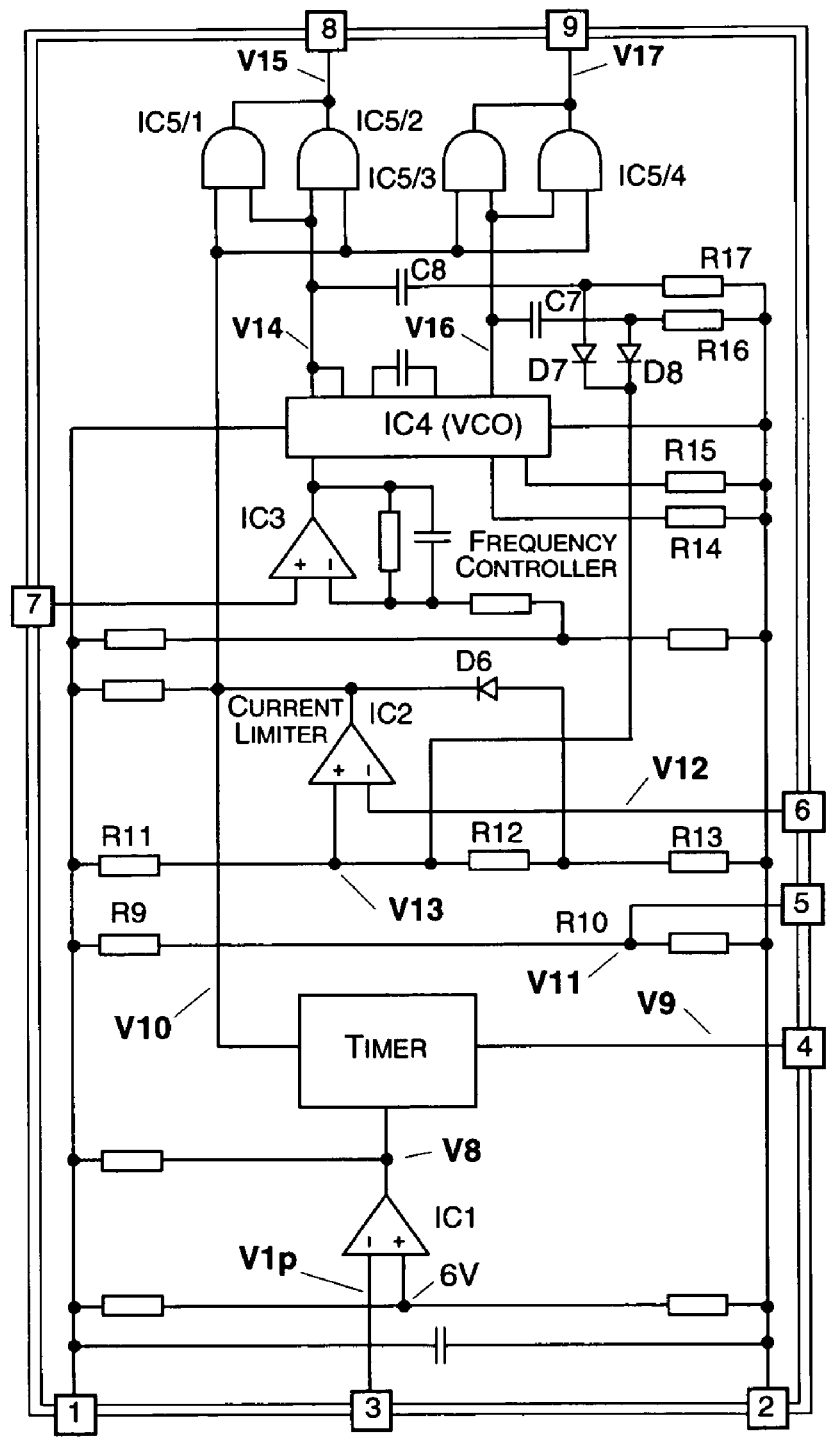
FIG. 4 shows the preferred schematic diagram of the Control Unit.

FIG. 4 shows a detailed schematic diagram of the Control Unit providing appropriate control signals for the Half-Bridge Inverter, namely driver signals for MOSFETs T1, T2, and T3. Functionally, the Control Unit has three basic parts: a Timer, a Current Limiter, and a Frequency Controller connected to a voltage controlled oscillator (VCO) IC4.

A) Timer. The Timer unit is controlled by voltage comparator IC1, where the inverting input is connected through the connecting point 3 of the Control Unit to the common point of the voltage divider resistors R7 and R8 (A7) shown in FIG. 1. Therefore, the voltage on the inverting input of IC1 (V1$p$) is proportional to the voltage V1 (see FIG. 1).

Figure 5:
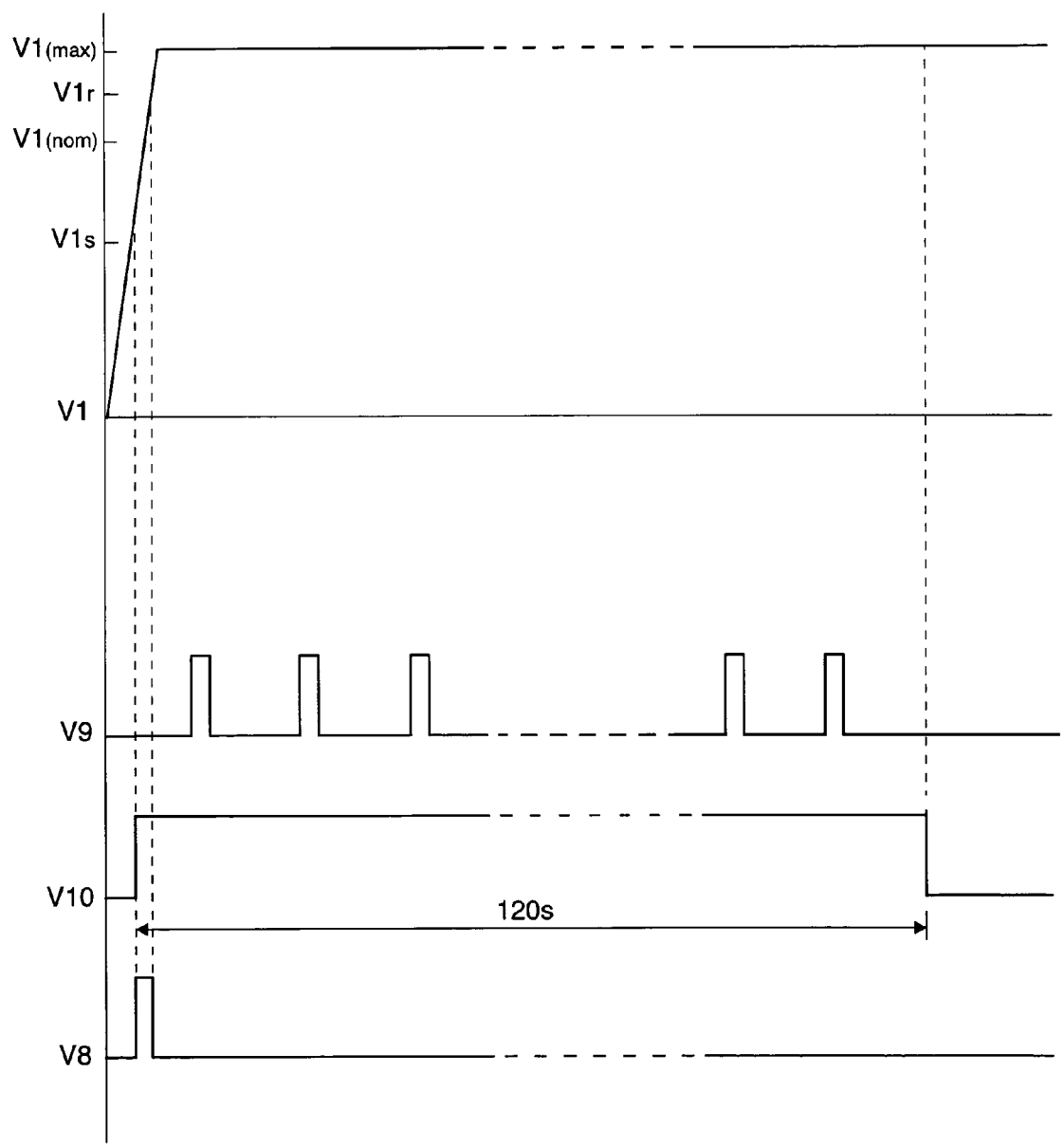
FIG. 5 shows the waveforms of an unsuccessful startup, namely in the cases of no load condition or failed lamp ignition.
Figure 6:
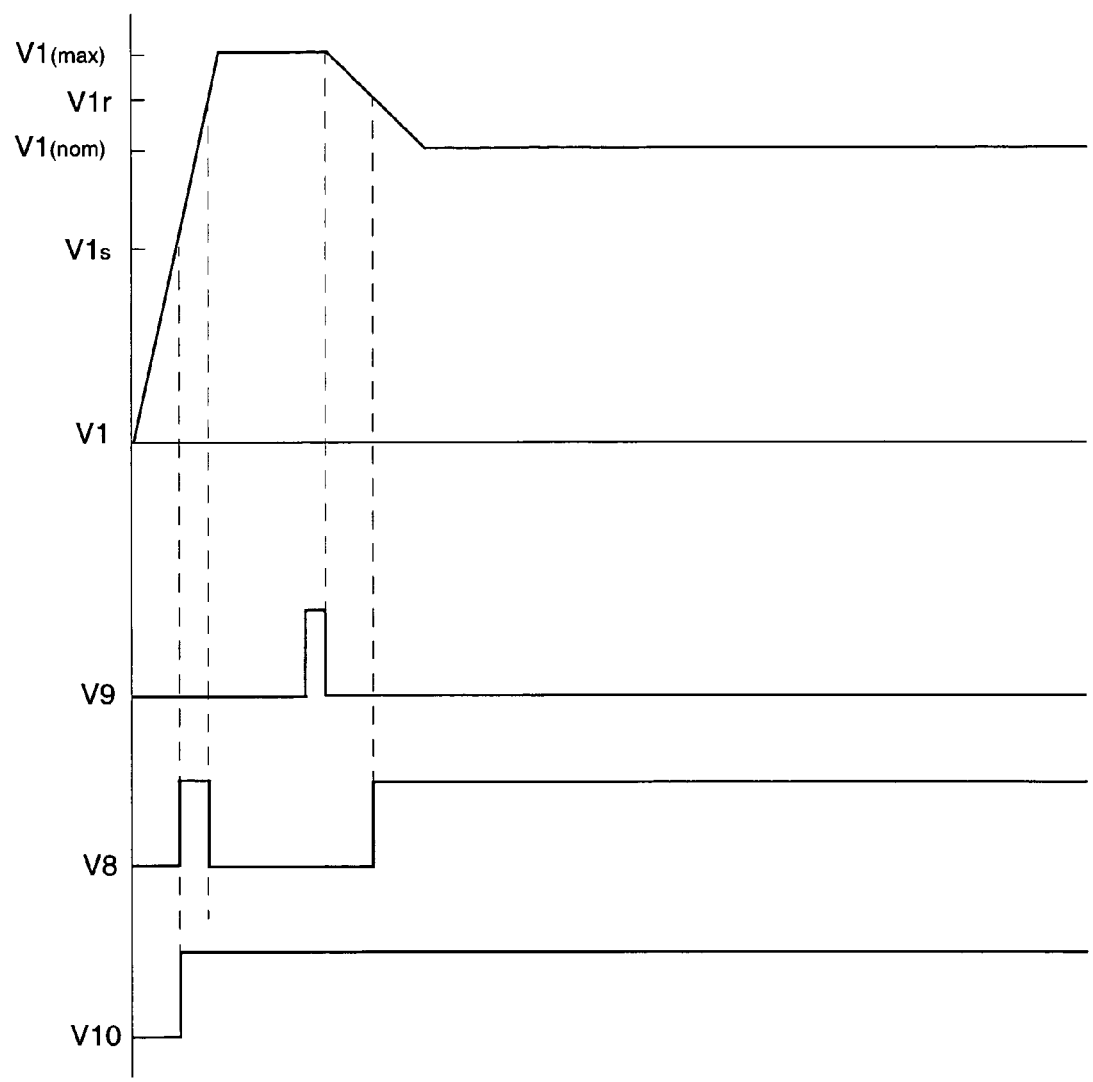
FIG. 6 shows the waveforms of a normal, successful startup process.

The startup process of the Control Unit (FIG. 4), therefore the whole circuit, is illustrated in FIG. 5 and FIG. 6, where V1$s$<V1$_{(nom)}$<V1$r$<V1$_{(max)}$.

1. V1$\geq$V1$s$. The Logic Supply provides stabilized 12V for the Control Unit, and V8=12V since V1$p$<6V, and V10=12V.

2. V1$\geq$V1$r$. The voltage V8=0 since V1$p$>6V, and the TIMER starts providing periodical ON/OFF signals (V9) for T3.

3a. Unsuccessful ignition or no load condition (see FIG. 5). After a predetermined time, for instance 120 s, the voltage V10 goes to zero and stops the periodical ON/OFF signal V9 for T3 (V9=0), and also switches off the main switches T1 and T2 (V15=V17=0).

3b. Successful ignition (see FIG. 6). Assuming that the first ignition signal ignited the lamp, the supply voltage V1 drops bellow V1$r$ (the DC Power Supply is loaded, and V1=V1$_{(nom)}$ which is equal to its regulated value), therefore V8=12V and it resets the TIMER (V9=0, and V10 remains high). The circuit solution for the Timer may be based on a CMOS ripple counter and a simple square wave oscillator.

Figure 7:
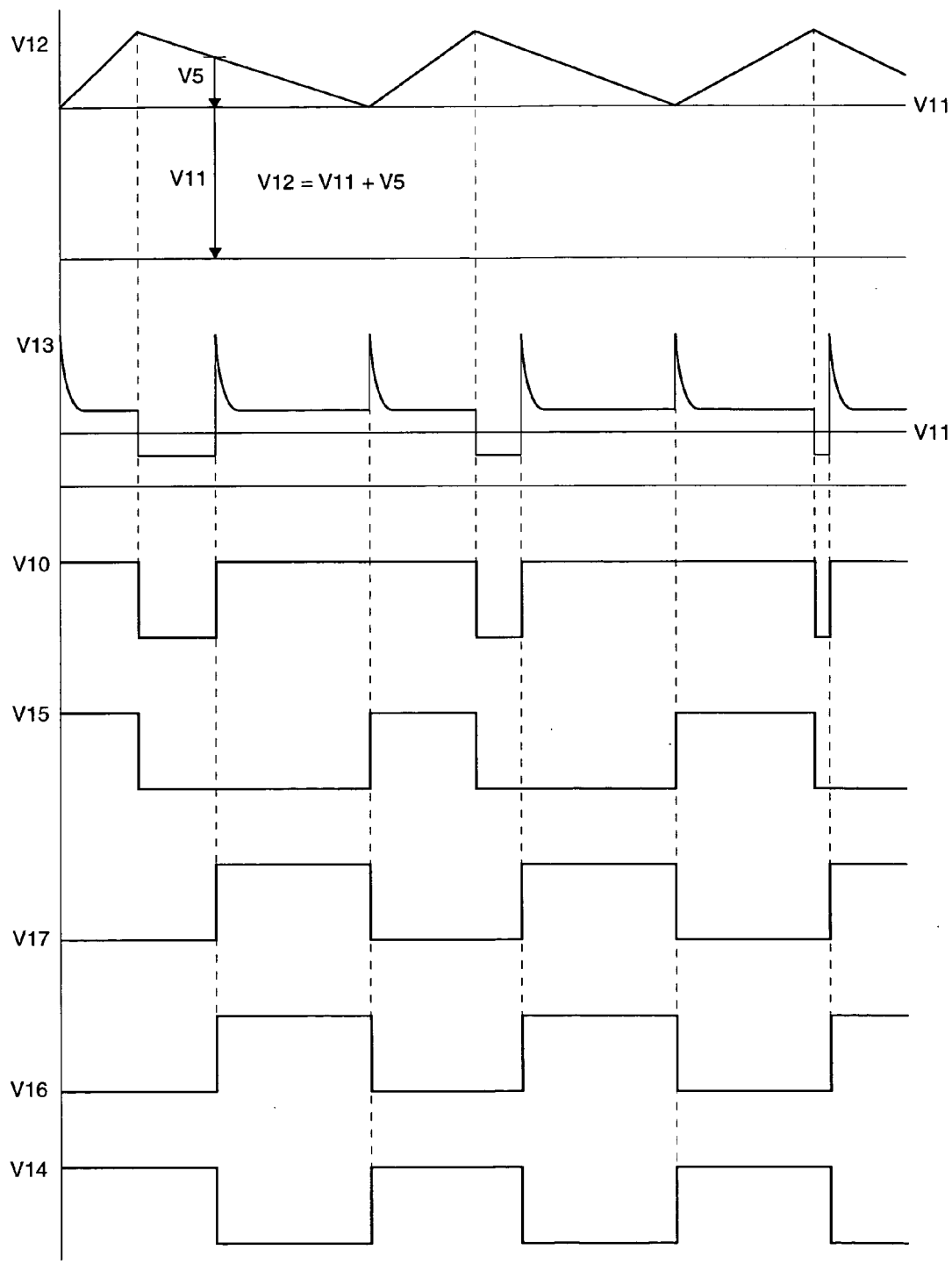
FIG. 7 shows the main voltage waveforms of the Control Unit.
Figure 8:
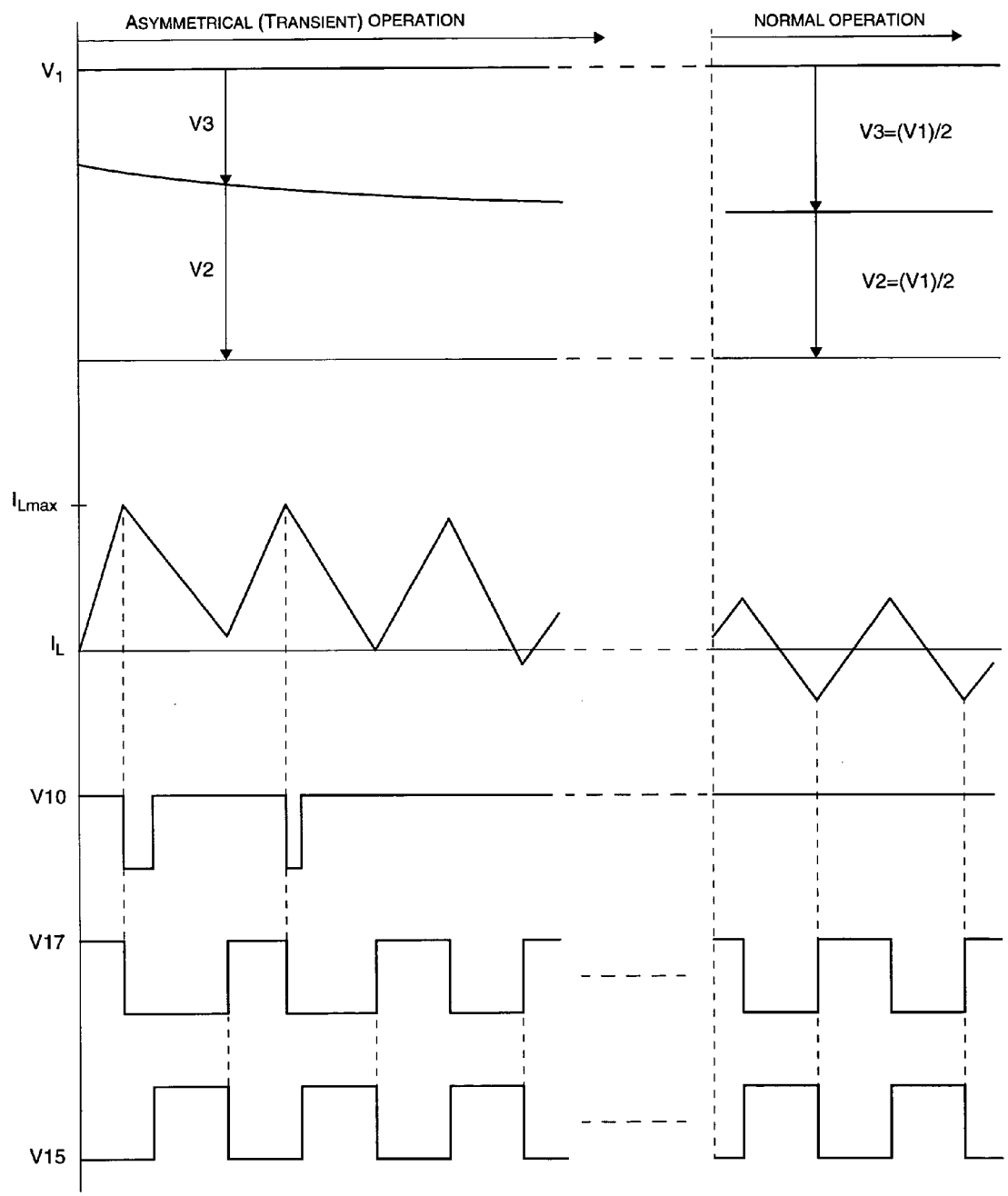
FIG. 8 shows the waveform of the transient asymmetrical operation during the startup process of a HID lamp.

B) Current Limiter. The output signal V5 of Current Transformer is connected to the connecting points 5 and 6 of the Control Unit as it is shown in in FIG. 4. Therefore, the voltage of the inverting input of the voltage comparator V12=V11+V5 as it is shown in FIG. 7. The voltage V11 is provided by the common point of the voltage divider resistors R9 and R10. Three resistors, R11, R12 and R13 are connected in series, where the common point of resistors R11 and R12 is connected to the non-inverting input of IC2 and the common point of resistors R12 and R23 is connected to the output of IC2 through a diode D6, resulting a resettable bistable multivibrator. The reset is provided in every half-period by differentiating the output signals V14 and V15 of the IC4 (VCO). These differentiators include capacitors C8, C7, and resistors R16, R17, respectively. The resulting waveforms are added and rectified by diodes D7, D8 and connected to the non-inverting input of IC2. The waveform V13 is shown in FIG. 7. Under normal condition when the output current I$_L$ remains in a predetermined range, the circuit has no effect. If the output current reaches the maximum allowable value, the output voltage of IC2 goes to zero (V10=0) as it is shown in FIG. 7, and forces the driver signals V15 and V17 going to zero since it is connected to the each input of the dual input AND gates (IC5/1, IC5/2, IC5/3 and IC5/4). The other inputs of the dual input AND gates are connected to the outputs of IC4 (V14 and V15). When V10=0, than V15= V17=0 and the main switches T1 and T2 of the inverter are simultaneously switched off as it was described previously. All main signals of the Control Unit are summarized in FIG. 7. Furthermore, FIG. 8 also illustrates the operation of the Current Limiter at asymmetrical operation, when V2>V3 (V2+V3=V1, and remains constant) and the output (lamp) current I$_L$ reaches a predetermined maximum value I$_{L(max)}$. The normal (symmetrical) operation is also shown in FIG. 8, where V2=V3, and the output current I$_L$ is symmetrical.

C) Frequency Controller. This unit is based on the operational amplifier IC3, where the non-inverting input (connecting point 7) is connected to voltage V4 of capacitor C4 shown in FIG. 1. The output of IC3 controls the frequency of the voltage controlled oscillator IC4. The outputs V14 and V16 are symmetrical square wave signals in opposite phase and are connected to the dual input AND gates of IC5. The gates IC5/1, IC5/2 and IC5/3, IC5/4 are connected parallel for increased current sink and source capability. The outputs (V15 and V17) of IC5 are the connecting points 8 and 9 of the Control Unit and are connected to the primary winding (N3) of transformer M2 (see FIG. 1) resulting a full-bridge configuration. As it was mentioned previously, the voltage V4 is nearly proportional to the lamp power. Therefore, the lamp power can be controlled by the frequency of a VCO (IC4) in a certain range. The maximum and the minimum frequency is determined by the resistors R16 and R17, respectively. In summary, the frequency of the voltage controlled oscillator IC4 is controlled by the operational amplifier IC3 in such a way that the lamp power remains the same in a predetermined lamp voltage range (80V–160V for HPS lamps and 120V–150V for MH lamps).

Figure 9:
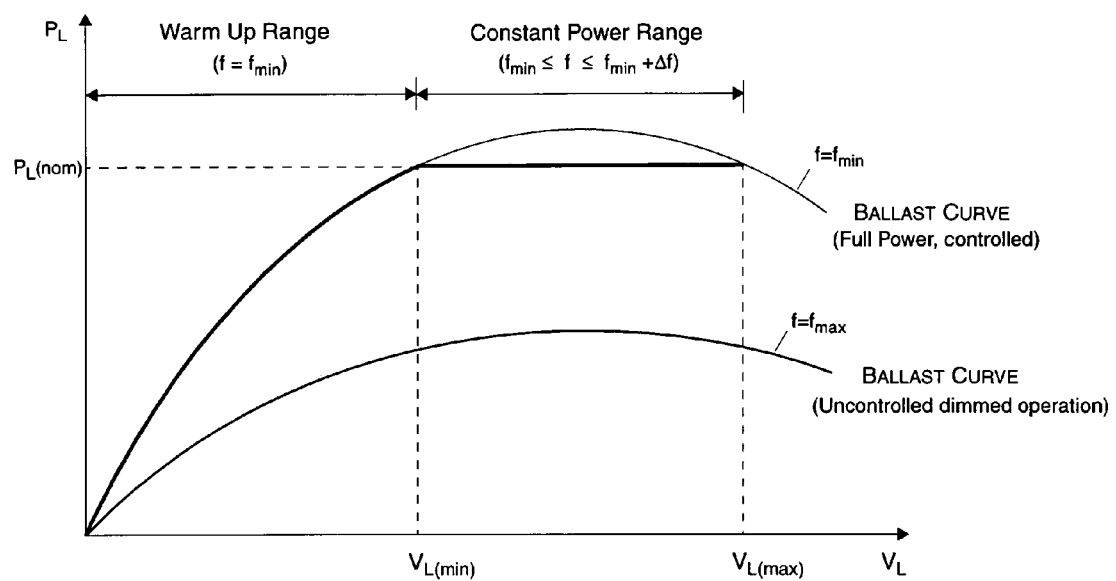
FIG. 9 shows the ballast curve including the warming up and constant power ranges provided by the present invention.

FIG. 9 shows the ballast curve (lamp power P$_L$ vs. lamp voltage V$_L$). It includes the warm up range (V$_L$<V$_{L(min)}$), where the lamp current frequency is minimum (f$_{min}$), and the constant power range (V$_{L(min)}$$\leq$V$_L$$\leq$V$_{L(max)}$), where the frequency is controlled (f$_{min}$$\leq$f$\leq$f$_{min}$+$\Delta$f) providing nearly constant lamp power. It also shows the dimmed operation, where the frequency has its maximum value (f$_{max}$) and remains the same (uncontrolled operation). The dimmed operation is achieved by closing the Dimming Switch S1 shown in FIG. 1. Therefore, the voltage V4 increases significantly causing the operational amplifier IC3 (see FIG. 4) out of its control range, and the frequency of the VCO (IC4) will have its maximum value determined by the resistor R14 and R15. At dimmed operation the output power (lamp power) is not controlled, but it remains in an acceptable practical range, determined by the ballast curve at maximum frequency. The dimmed operation, where the lamp power is approximately the half (40%–50%) of its nominal value provides significant energy saving if the full lamp power is not required in certain times.

Thus, while preferred embodiments of the present invention have been shown and described in details, it is to be understood that such adaptation and modifications as may occur to those skilled in the art may be employed departing from the spirit and scope of the invention, as set forth in the claims.

I claim:

1. The half-bridge inverter for asymmetrical load comprising:
  a DC power supply connected to the half-bridge inverter,
  a logic supply providing stabilized low voltage supply source,
  a first and a second electronically controlled switch,
  a first and a second voltage divider capacitor,
  an asymmetrical load connected to the output of the half-bridge inverter,
  a power resistor connected to an RC filter
  a first and a second identical drivers connected to the first and second electronically controlled switches,
  a low power signal transformer having a primary and a first and a second secondary winding,
  an ignitor unit, having a third electronically controlled switch, a current transformer having a first and a second winding,
an inductor, having a first and a second winding,
a control unit; wherein,
the power resistor placed between the half-bridge inverter and the DC power supply, and
the logic supply is connected to the control unit, and
the first and second drivers are connected to the first and second secondary windings of the low power signal transformer, and
the primary winding of low power signal transformer is connected to the control unit, and
the third electronically controlled switch is connected to the control unit, and
the first winding of current transformer is connected in series with the asymmetrical load, and
the second winding of inductor is connected in series with a high intensity discharge lamp, accomplishing an asymmetrical load, and
the first winding of inductor is connected to the ignitor unit.

2. The half-bridge inverter for asymmetrical load in accordance with claim 1; wherein,
the said first, and the second electronically controlled switches are MOSFETs, accomplishing a first and a second power MOSFET.

3. An ignitor unit in accordance with claim 1, further comprising:
a second capacitor, a first rectifier, a fifth resistor; wherein,
the said third electronically controlled switch is a third power MOSFET, the first winding of said inductor is connected to an end of the second capacitor and the drain of third power MOSFET, the another end of second capacitor is connected to the source of third MOSFET, the first rectifier and the fifth resistor are connected in parallel, the cathode of the first rectifier is connected to said DC power supply and the anode of first rectifier is connected to the drain of third MOSFET, the gate of the third power MOSFET is connected to said control unit.

4. The current transformer in accordance of claim 1, further comprising:
a second bridge rectifier, a sixth resistor; wherein,
the second winding of said current transformer is connected to the AC input of the second bridge rectifier, the DC output of the second bridge rectifier is connected to the sixth resistor.

5. The half-bridge inverter for asymmetrical load in accordance with claim 1; wherein,
the said two identical drivers are MOSFET drivers, accomplishing a first and a second identical MOSFET driver.

6. The first MOSFET driver in accordance with claim 5, comprising:
a first bridge rectifier, a low power MOSFET, a low power bipolar transistor, a first, a second, a third and a fourth resistor, a diode, and a first capacitor; wherein,
the AC input of the bridge rectifier is connected to said first winding of said low power signal transformer, and further connected to the first and second resistors, the gate of the low power MOSFET is connected to the first resistor, and the drain of the low power MOSFET is connected to the second resistor and the gate of the first MOSFET, the common anodes of the bridge rectifiers is connected to the source of the low power MOSFET and said first power MOSFET, the common cathodes of the bridge rectifiers is connected to the third resistor connected in series with the fourth resistor, the common point of the third and fourth resistors is connected to the base of the low power bipolar transistor, and further connected to the anode of the diode, the collector of the low power bipolar transistor is connected to the gate of the low power MOSFET, the emitter of the power bipolar transistor is connected to the cathode of the diode, and further connected to an end of the first capacitor, the another end of the first capacitor is connected to the common anodes of the bridge rectifier.

7. The control unit in accordance with claim 1, comprising:
a first voltage comparator, a timer unit having an input, a first and a second output, a current limiter, a frequency controller amplifier, a voltage controlled oscillator having an input, and a first and a second output providing symmetrical square wave signals in opposite phase, a first and a second dual input AND gates; wherein,
the input of the first voltage comparator is connected to said DC power supply, the output of the first voltage comparator is connected to the input of the timer, the first output of the timer is connected to the gate of said third MOSFET, the second output of the timer is connected to an input of the dual input AND gates, the input of the current limiter is connected to said said sixth resistor, the output of the current limiter is connected to the output of the timer, therefore to the same inputs of the dual input AND gates, the input of the frequency controller amplifier is connected to said RC filter, the output of the frequency controller amplifier is connected to the input of the voltage controlled oscillator, the first and the second outputs of the voltage controlled oscillator are connected to an another input of the dual input AND gates, the outputs of the dual input AND gates are connected to the primary winding of said low power signal transformer.

8. The current limiter in accordance of claim 7, comprising:
a second voltage comparator, a seventh, an eights, a ninth, a tenth and an eleventh resistor, a second, a third and a fourth rectifier, a third and a fourth capacitor; wherein,
the input of the current limiter is accomplished by the inverting input of the second voltage comparator, the output of the current limiter is accomplished by the output of the second voltage comparator, the resistors seventh, eights and ninth are connected in series, the common point of resistor seventh and eights is connected to the non-inverting input of the second voltage comparator, the common point of resistors eights and ninths is connected to the anode of second rectifier, the cathode of the second rectifier is connected to the output of the second voltage comparator, an end of the third capacitor is connected to the first output of said voltage controlled oscillator and the another end of the third capacitor is connected to the tenth resistor, the common point of third capacitor and the tenth resistor is connected to the anode of the third rectifier, an end of the fourth capacitor is connected to the second output of said voltage controlled oscillator and the another end of the fourth capacitor is connected to the eleventh resistor, the common point of fourth capacitor and the eleventh resistor is connected to the anode of the fourth rectifier, the cathodes of the rectifiers third and fourth are connected to the non-inverting input of the second voltage comparator.

* * * * *